(12) United States Patent
Lewis

(10) Patent No.: US 11,512,749 B1
(45) Date of Patent: Nov. 29, 2022

(54) BRAKE PISTON-PUSHING TOOL

(71) Applicant: Bruce Lewis, Spring Valley, NY (US)

(72) Inventor: Bruce Lewis, Spring Valley, NY (US)

( * ) Notice: Subject to any disclaimer, the term of this patent is extended or adjusted under 35 U.S.C. 154(b) by 380 days.

(21) Appl. No.: 16/813,926

(22) Filed: Mar. 10, 2020

(51) Int. Cl.
| | |
|---|---|
| *B23P 19/04* | (2006.01) |
| *F16D 65/00* | (2006.01) |
| *B25B 27/00* | (2006.01) |
| *F16D 65/18* | (2006.01) |
| *B25B 27/02* | (2006.01) |

(52) U.S. Cl.
CPC ...... *F16D 65/0043* (2013.01); *B25B 27/0035* (2013.01); *B25B 27/023* (2013.01); *F16D 65/0068* (2013.01); *F16D 65/183* (2013.01)

(58) Field of Classification Search
CPC .......................... B25B 27/0035; B25B 27/068
USPC ................................................... 29/239, 256
See application file for complete search history.

(56) References Cited

U.S. PATENT DOCUMENTS

| | | | |
|---|---|---|---|
| 2,768,664 A * | 10/1956 | Morgan | B25B 5/101 81/133 |
| 6,192,566 B1 | 2/2001 | Dunum | |
| 6,378,185 B1 | 4/2002 | Ratchovsky | |
| D457,795 S | 5/2002 | Mohammed | |
| 6,523,238 B1 | 2/2003 | Priddy | |
| 6,574,846 B1 * | 6/2003 | Kang | B25B 27/0035 29/256 |
| 8,826,504 B1 | 9/2014 | Silvon | |
| 11,135,709 B2 * | 10/2021 | Engel | B25B 5/068 |
| 2005/0015979 A1 | 1/2005 | Walters | |
| 2010/0236044 A1 | 9/2010 | Bearman | |

FOREIGN PATENT DOCUMENTS

WO   2005014235   2/2005

* cited by examiner

*Primary Examiner* — Christopher P Schwartz
(74) *Attorney, Agent, or Firm* — Kyle A. Fletcher, Esq.

(57) ABSTRACT

The brake piston pushing tool is a mechanical device. The brake piston pushing tool comprises a worm drive and a brake mechanism. The brake mechanism is a mechanical device used to slow and stop the motion of a vehicle. The brake mechanism is a well-known and documented device. The brake mechanism further comprises a caliper housing, a piston, and an anvil. The anvil attaches to the caliper housing such that a space is formed between the caliper housing and the anvil. The piston installs in the caliper housing such that the piston slides into and out of the space formed between the caliper housing and the anvil. The worm drive is a mechanical device that pushes the piston into the caliper during maintenance activities on the brake mechanism.

15 Claims, 4 Drawing Sheets

BRAKE PISTON-PUSHING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of engineering elements of mechanical engineering including brakes, more specifically, a tool for brakes maintenance and assembly. (F16D65/0043)

SUMMARY OF INVENTION

The brake piston pushing tool is a mechanical device. The brake piston pushing tool comprises a worm drive and a brake mechanism. The brake mechanism is a mechanical device used to slow and stop the motion of a vehicle. The brake mechanism is a well-known and documented device. The brake mechanism further comprises a caliper housing, a piston, and an anvil. The anvil attaches to the caliper housing such that a space is formed between the caliper housing and the anvil. The piston installs in the caliper housing such that the piston slides into and out of the space formed between the caliper housing and the anvil. The worm drive is a mechanical device that pushes the piston into the caliper during maintenance activities on the brake mechanism.

These together with additional objects, features and advantages of the brake piston pushing tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the brake piston pushing tool in detail, it is to be understood that the brake piston pushing tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the brake piston pushing tool.

It is therefore important that the claims be regarded as including such equivalent construction insofar as they do not depart from the spirit and scope of the brake piston pushing tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
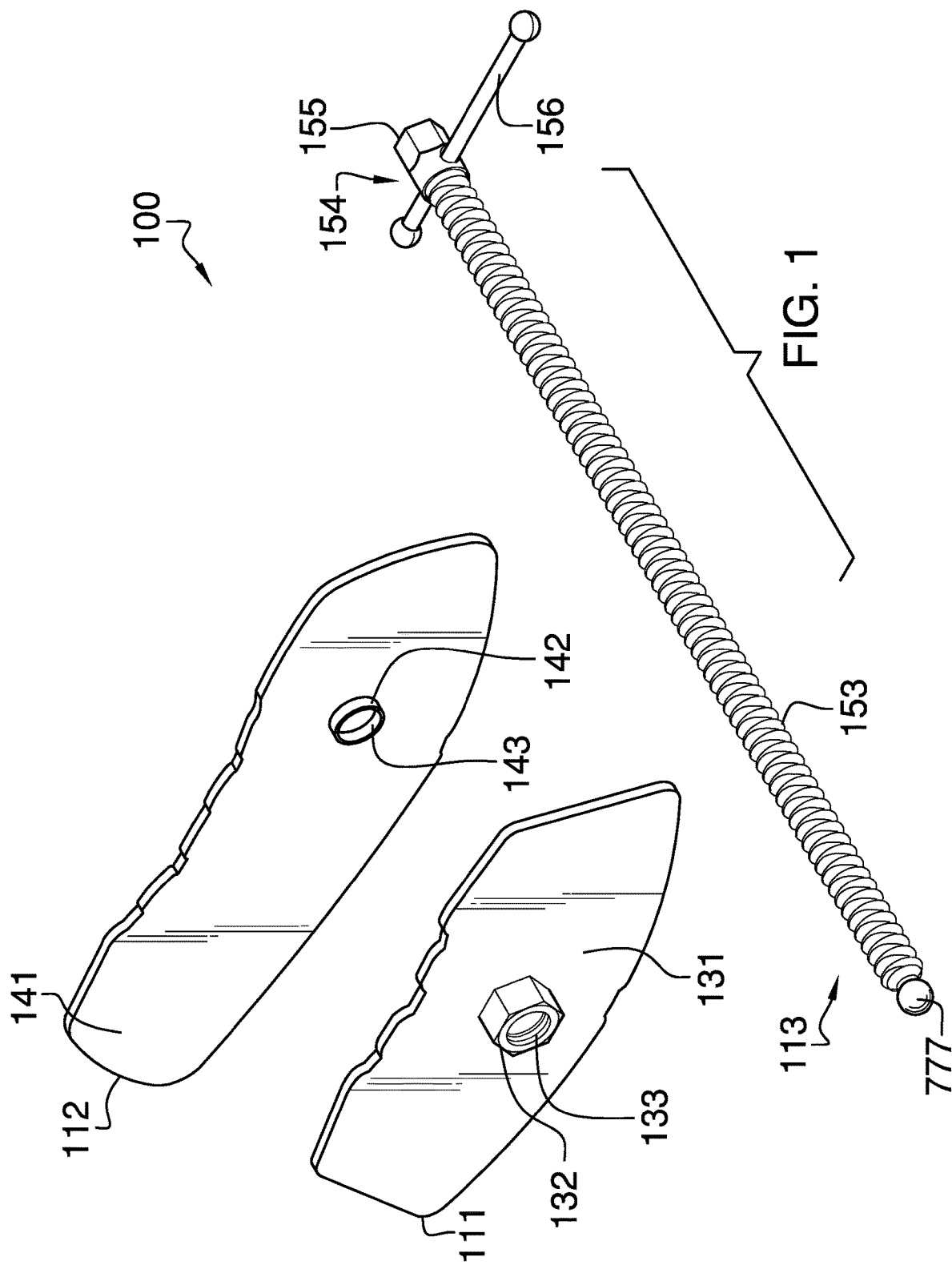
FIG. 1 is a perspective view of an embodiment of the disclosure.
Figure 2:
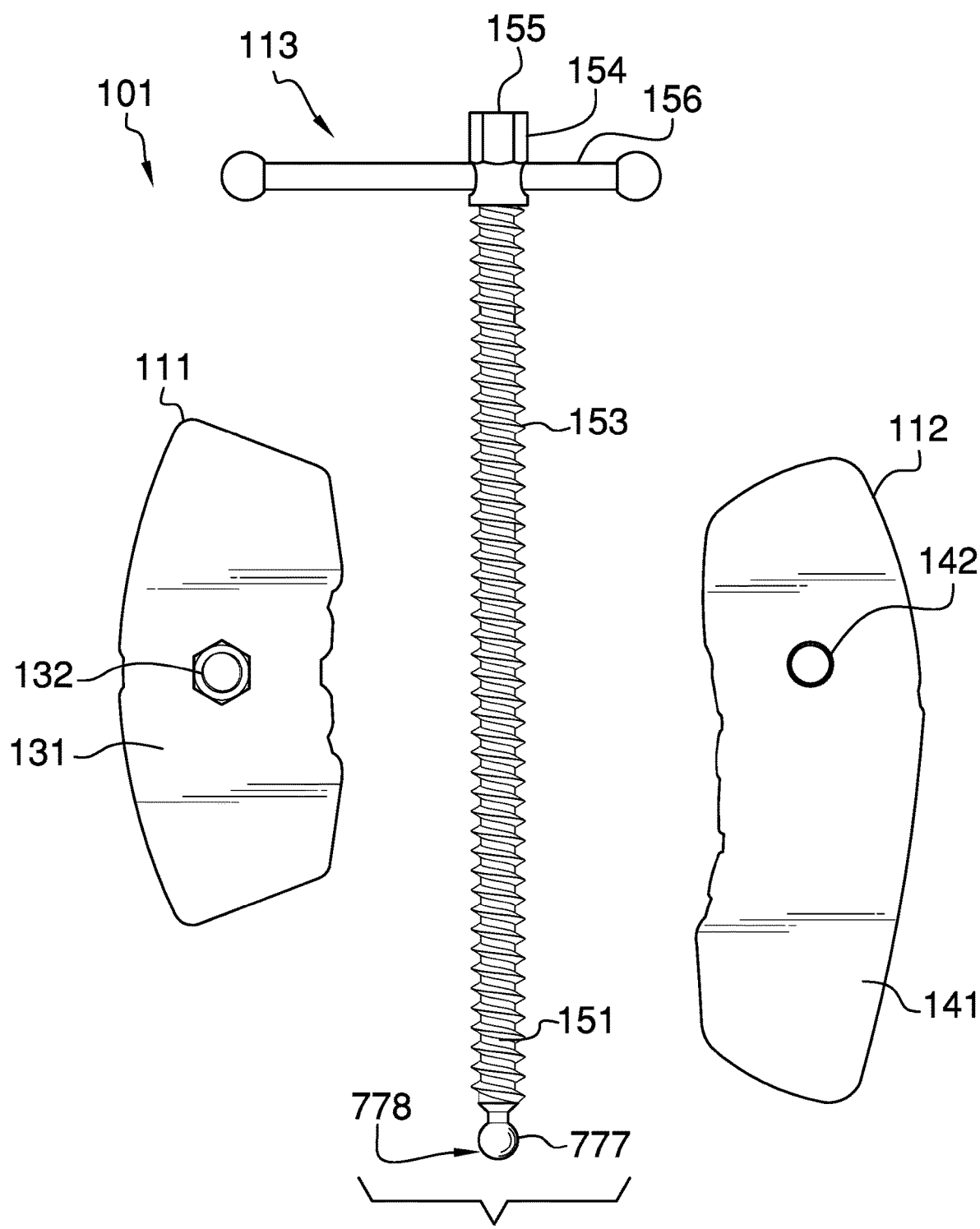
FIG. 2 is a front view of an embodiment of the disclosure.
Figure 3:
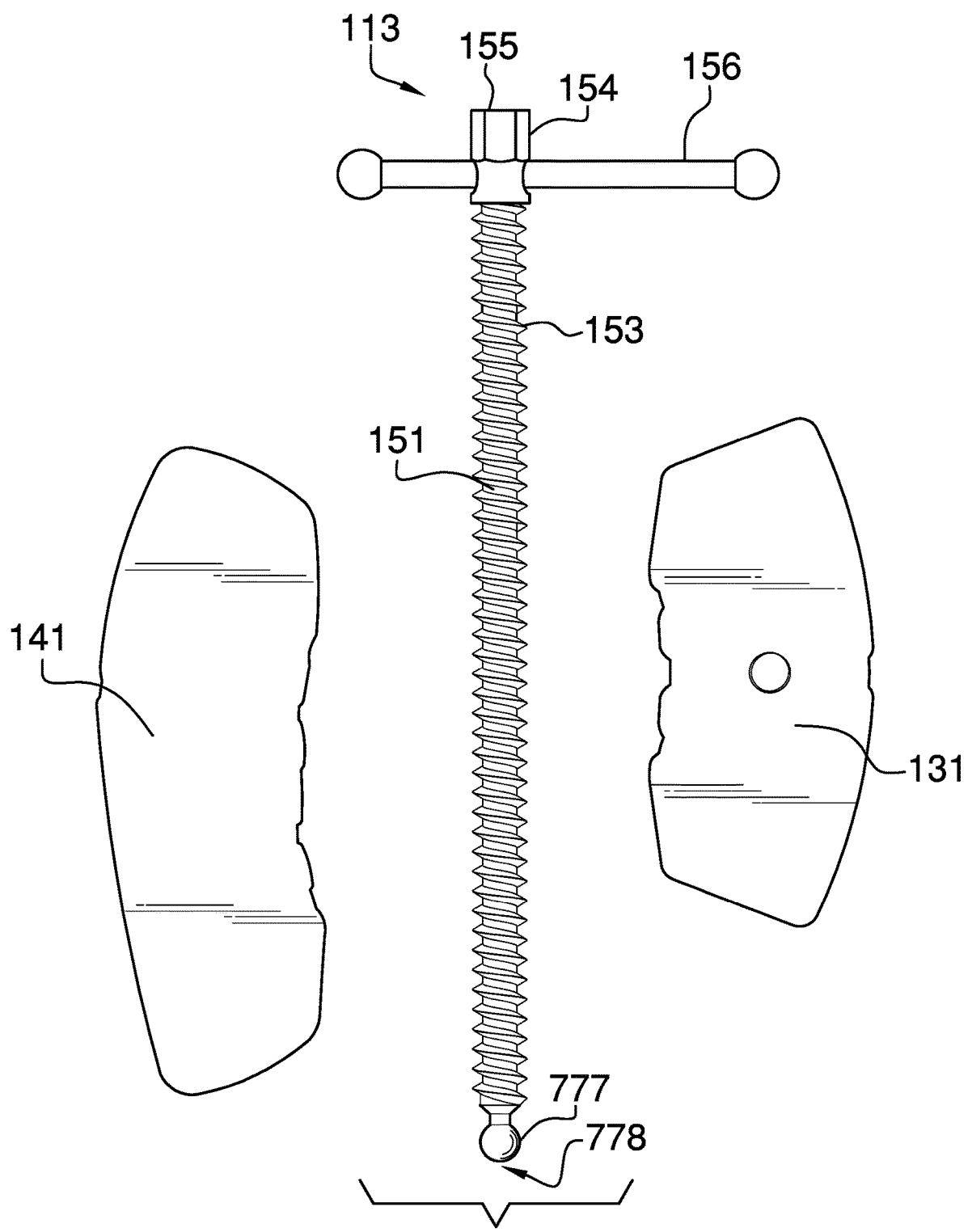
FIG. 3 is a rear view of an embodiment of the disclosure.
Figure 4:
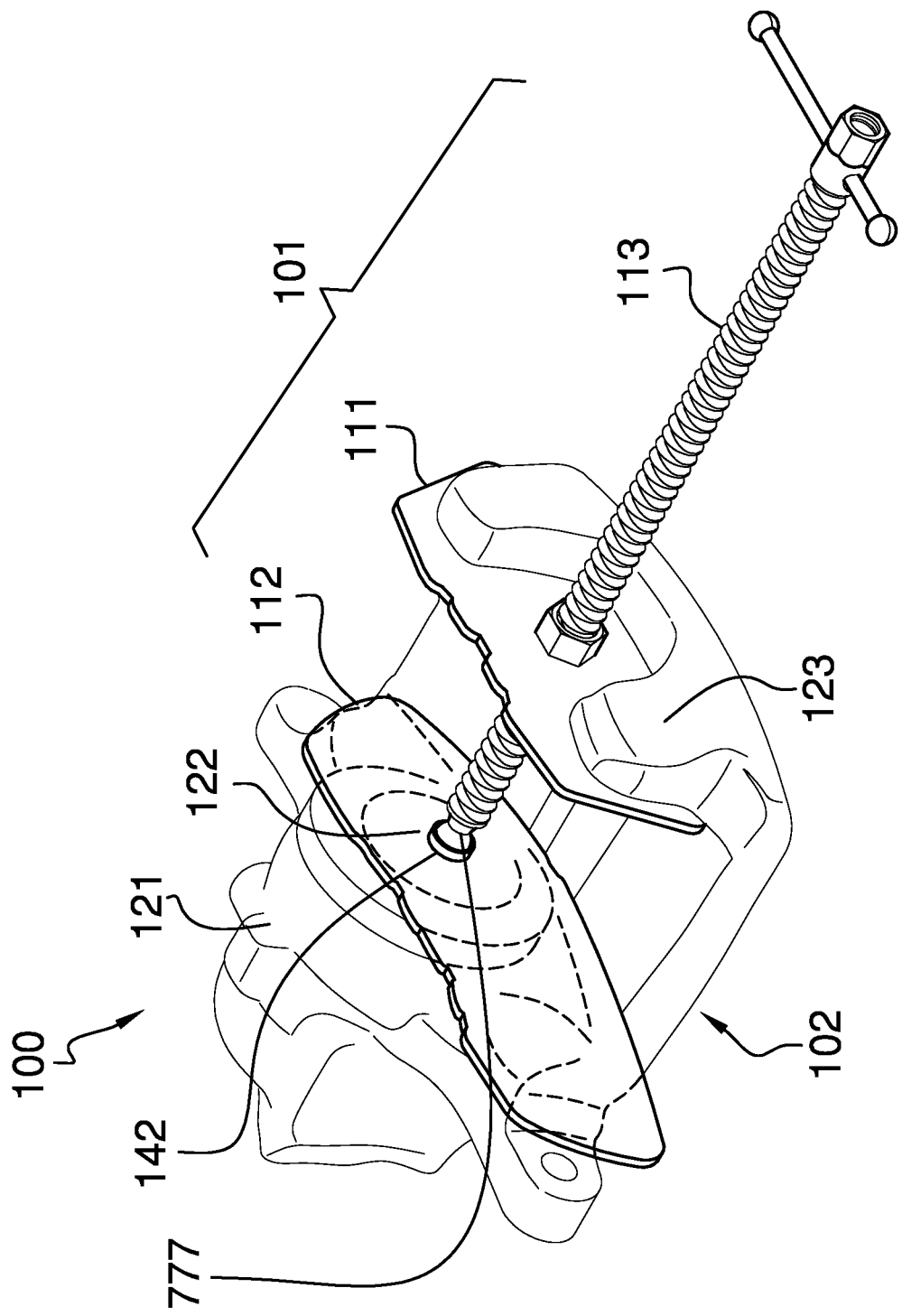
FIG. 4 is an in-use view of an embodiment of the disclosure.

Detailed reference will now be made to one or more potential embodiments of the disclosure, which are illustrated in FIGS. 1 through 4.

The brake piston pushing tool 100 (hereinafter invention) is a mechanical device. The invention 100 comprises a worm drive 101 and a brake mechanism 102. The brake mechanism 102 is a mechanical device used to slow and stop the motion of a vehicle. The brake mechanism 102 is a well-known and documented device. The brake mechanism 102 further comprises a caliper housing 121, a piston 122, and an anvil 123. The anvil 123 attaches to the caliper housing 121 such that a space is formed between the caliper housing 121 and the anvil 123. The piston 122 installs in the caliper housing 121 such that the piston 122 slides into and out of the space formed between the caliper housing 121 and the anvil 123. The worm drive 101 is a mechanical device that pushes the piston 122 into the caliper during maintenance activities on the brake mechanism 102. The worm drive 101 is described and defined elsewhere in this disclosure.

The brake mechanism 102 is a mechanical device. The brake mechanism 102 slows and stops the motion of a vehicle. The brake mechanism 102 clamps a rotating disk associated with a wheel of the vehicle. The design and use of a brake mechanism 102 are well-known and documented in the mechanical arts. The brake mechanism 102 comprises a caliper housing 121, a piston 122, and an anvil 123.

The caliper housing 121 is a rigid structure. The caliper housing 121 is a mechanical structure. The caliper housing 121 contains the piston 122. The caliper housing 121 contains a hydraulic mechanism that discharges the piston 122 into the space between the caliper housing 121 and the anvil 123. The hydraulic system of the caliper housing 121 further withdraws the piston 122 back into the caliper housing 121 from the space between the caliper housing 121 and the anvil 123. Methods to design and implement the hydraulic mechanism of the caliper housing 121 described above are well-known and documented in the mechanical arts. The invention 100 is configured to push the piston 122 back into the caliper housing 121 when the hydraulic system fails to do so.

The piston 122 is a rigid structure. The piston 122 is a mechanical structure. The piston 122 installs in the caliper housing 121. The piston 122 is the physical mechanical structure that deploys into and withdraws from the space between the caliper housing 121 and the anvil 123.

The anvil 123 is a rigid structure. The anvil 123 is a mechanical structure. The anvil 123 attaches to the caliper housing 121 to form the space between the caliper housing 121 and the anvil 123. The anvil 123 forms a barrier the holds the anvil 123 plate 112 in a fixed position relative to the brake mechanism 102 while the drive mechanism 113 is rotating through the anvil 123 plate 112. By fixing the anvil 123 plate 112 against the anvil 123, the forces generated by the rotation of the drive mechanism 113 are concentrated against the piston 122 plate 111 thereby pushing the piston 122 back into the piston 122 plate 111.

The worm drive 101 is a mechanical device. The worm drive 101 is a hand driven device. The worm drive 101 provides the motive force required to push the piston 122 into the caliper housing 121 of the brake mechanism 102. The worm drive 101 comprises a piston 122 plate 111, an anvil 123 plate 112, and a drive mechanism 113. The drive mechanism 113 attaches the piston 122 plate 111 to the anvil 123 plate 112.

The piston 122 plate 111 is a rigid structure. The piston 122 plate 111 is a disk-shaped structure. The piston 122 plate 111 attaches to an end of the drive mechanism 113. The position of the piston 122 plate 111 relative to the anvil 123 plate 112 is controlled by the rotation of the drive mechanism 113. The piston 122 plate 111 presses against the piston 122 of the brake mechanism 102 to force the piston 122 into the caliper housing 121. The piston 122 plate 111 comprises a piston 122 disk 131, a piston 122 nut 132, and a piston 122 interior screw thread 133.

The piston 122 disk 131 is a rigid structure. The piston 122 disk 131 is a mechanical structure. The piston 122 disk 131 has a disk structure. The piston 122 disk 131 mounts on an end of the drive mechanism 113. The piston 122 disk 131 presses against the piston 122 to push the piston 122 into the caliper housing 121.

The piston 122 nut 132 is a rigid structure. The piston 122 nut 132 is a mechanical structure. The piston 122 nut 132 has a nut structure. The piston 122 nut 132 attaches to a face of the disk structure of the piston 122 disk 131. The piston 122 nut 132 attaches the drive mechanism 113 to the piston 122 disk 131. The center axis of the piston 122 nut 132 aligns with the center axis of the piston 122 disk 131. The piston 122 nut 132 is positioned such that the center axis of the piston 122 nut 132 aligns with the center axis of the disk structure of the piston 122 disk 131.

The piston 122 interior screw thread 133 is a negative space formed in the piston 122 nut 132. The negative space of the piston 122 interior screw thread 133 is formed with an interior screw thread. The piston 122 interior screw thread 133 is sized such that the drive cylinder 151 of the drive mechanism 113 fits into the piston 122 interior screw thread 133. The piston 122 interior screw thread 133 is formed such that the end of the drive cylinder 151 of the drive mechanism 113 that is distal from the handle 154 will screw into the piston 122 interior screw thread 133 to form a threaded connection.

The anvil 123 plate 112 is a rigid structure. The anvil 123 plate 112 is a disk-shaped structure. The drive mechanism 113 inserts through the anvil 123 plate 112 to form a threaded connection. The anvil 123 plate 112 presses against the anvil 123 of the brake mechanism 102 such that the rotation of the drive mechanism 113 through the anvil 123 plate 112 fixes the anvil 123 plate 112 against the anvil 123 which allows the drive mechanism 113 to press the piston 122 plate 111 into the piston 122. The anvil 123 plate 112 comprises an anvil 123 disk 141, an anvil 123 receptacle 142.

The anvil 123 disk 141 is a rigid structure. The anvil 123 disk 141 is a mechanical structure. The anvil 123 disk 141 has a disk structure. The drive cylinder 151 of the drive mechanism 113 is screwed through the anvil 123 disk 141 to form a threaded connection.

The anvil 123 receptacle 142 is a mechanical structure. The anvil 123 receptacle 142 has a nut structure. The anvil 123 receptacle 142 is formed through the faces of the anvil 123 disk 141. The center axis of the anvil 123 receptacle 142 aligns with the center axis of the anvil 123 disk 141. The anvil 123 receptacle 142 is positioned such that the center axis of the anvil 123 receptacle 142 aligns with the center axis of the disk structure of the drive cylinder 151 of the drive mechanism 113. A ball member 777 provided on a distal end 778 of the drive cylinder 151 of the drive mechanism 113 seats against the anvil 123 receptacle 142 to secure the anvil 123 plate 112 to the drive mechanism 113.

The drive mechanism 113 is a bolt based structure. The drive mechanism 113 is a threaded structure. The drive mechanism 113 screws through the anvil 123 plate 112 to form a threaded connection. The drive mechanism 113 screws into the piston 122 plate 111 to form a threaded connection. The drive mechanism 113 controls the span of the distance between the piston 122 plate 111 and the anvil 123 plate 112. The span of the distance between the piston 122 plate 111 and the anvil 123 plate 112 adjusts by rotating the drive mechanism 113 to change the position of the anvil 123 plate 112 along the center axis of the drive mechanism 113. The drive mechanism 113 comprises a drive cylinder 151, an exterior screw thread 153, and a handle 154.

The drive cylinder 151 is a cylindrical shaft structure. The drive cylinder 151 has a bolt structure that further comprises an exterior screw thread 153.

The exterior screw thread 153 is formed on the lateral face of the drive cylinder 151. The exterior screw thread 153 forms the threaded connection between the anvil 123 receptacle 142 of the anvil 123 disk 141 and the drive cylinder 151 of the drive mechanism 113. The exterior screw thread 153 forms the threaded connection between the piston 122 nut 132 of the piston 122 disk 131 and the drive cylinder 151 of the drive mechanism 113. The rotation of the drive cylinder 151 within the anvil 123 receptacle 142 of the anvil 123 disk 141 causes the span of the distance between the piston 122 plate 111 relative to the center axis of the anvil 123 plate 112 to change.

The handle 154 is a grip that attaches to the end of the drive cylinder 151 that is distal from the piston 122 disk 131 of the piston 122 plate 111. The handle 154 rotates the drive cylinder 151. The end cap 155 is a mechanical structure. The handle 154 comprises an end cap 155, and a lever 156. The end cap 155 attaches the lever 156 to the drive cylinder 151 such that the lever 156 can rotate the end cap 155. The lever 156 is a prism-shaped shaft that attaches to the end cap 155 such that the center axis of the prism structure of the lever 156 is perpendicular to the center axis of the cylindrical structure of the drive cylinder 151.

The following definitions were used in this disclosure:

Brake: As used in this disclosure, a brake is a device that is used to slow or stop the motion of a machine or a vehicle.

Bolt: As used in this disclosure, a bolt is a cylindrical shaft that is formed with an exterior screw thread. A bolt is defined with an outer diameter.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Correspond: As used in this disclosure, the term correspond is used as a comparison between two or more objects wherein one or more properties shared by the two or more objects match, agree, or align within acceptable manufacturing tolerances.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Lever: As used in this disclosure, a lever is a simple machine that comprises a shaft that rotates around a fulcrum, an axis of rotation, or a pivot point.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Piston: As used in this disclosure, a piston is a prism or disk that closely fits within a pipe or tube and that moves along the center axis of the pipe or tube. Depending on the context, a piston can also refer to the apparatus associated with the disk that allows the disk to move within the pipe or tube.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board or a plank.

Screw: As used in this disclosure, to screw is a verb meaning: 1) to fasten or unfasten (unscrew) a threaded connection; or 2) to attach a helical structure to a solid structure.

Simple Machine: As used in this disclosure, a simple machine refers to a device that consists of a mechanism selected from the group consisting of: 1) an inclined plane, 2) a lever; 3) a pivot, 4) a pulley, 5) a screw, 6) a spring, 7) a wedge, and 8) a wheel (including axles). A compound machine is a device that consists of a plurality of mechanisms selected from the group consisting of the simple machine.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tube: As used in this disclosure, the term tube is used to describe a rigid hollow prism-shaped device with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Worm Drive: As used in this disclosure, a worm drive refers to a mechanical arrangement where a rotating cylinder further comprising an exterior screw thread is used to: 1) rotate a gear; or 2) move a plate formed with an interior screw thread in a linear fashion in the direction of the center axis of the rotating cylinder. Worm drives are also referred to as worm gears.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A maintenance device comprising:
a worm drive and a brake mechanism;
wherein the maintenance device is a mechanical device;
wherein the brake mechanism further comprises a caliper housing, a piston, and an anvil;
wherein the anvil attaches to the caliper housing such that a space is formed between the caliper housing and the anvil;
wherein the piston installs in the caliper housing such that the piston slides into and out of the space formed between the caliper housing and the anvil;
wherein the worm drive is a mechanical device that pushes the piston into the caliper;
wherein the worm drive comprises a piston plate, an anvil plate, and a drive mechanism;
wherein the drive mechanism attaches the piston plate to the anvil plate;
wherein the piston plate comprises a piston disk, a piston nut, and a piston interior screw thread;
wherein the piston nut attaches to the piston plate;
wherein the piston interior screw thread is formed in the piston nut;
wherein the anvil plate comprises an anvil disk, and an anvil receptacle;
wherein the anvil receptacle is formed on the anvil disk;
wherein the drive mechanism is further defined with a ball member that is provided on a distal end of the drive cylinder;
wherein the ball member of the drive cylinder seats against the anvil receptacle to secure the drive cylinder with respect to the anvil.

2. The maintenance device according to claim 1
wherein the piston is a rigid structure;
wherein the anvil is a rigid structure;
wherein the anvil is a mechanical structure;
wherein the anvil attaches to the caliper housing to form the space between the caliper housing and the anvil;
wherein the anvil forms a barrier the holds the worm drive in a fixed position relative to the brake mechanism.

3. The maintenance device according to claim 2
wherein the caliper housing is a rigid structure;
wherein the caliper housing is a mechanical structure;
wherein the caliper housing contains the piston;
wherein the caliper housing discharges the piston into the space between the caliper housing and the anvil;
wherein caliper housing withdraws the piston back into the caliper housing from the space between the caliper housing and the anvil.

4. The maintenance device according to claim 3
wherein the worm drive is a mechanical device;
wherein the worm drive is a hand driven device;
wherein the worm drive provides the motive force required to push the piston into the caliper housing of the brake mechanism.

5. The maintenance device according to claim 4
wherein the piston plate is a rigid structure;
wherein the piston plate is a disk-shaped structure;
wherein the piston plate attaches to an end of the drive mechanism.

6. The maintenance device according to claim 5
wherein the anvil plate is a rigid structure;
wherein the anvil plate is a disk-shaped structure;
wherein the drive mechanism inserts through the anvil plate to form a threaded connection;
wherein the anvil plate presses against the anvil of the brake mechanism such that the rotation of the drive mechanism through the anvil plate fixes the anvil plate against the anvil which allows the drive mechanism to press the piston plate into the piston.

7. The maintenance device according to claim 6
wherein the drive mechanism is a bolt based structure;
wherein the drive mechanism is a threaded structure;
wherein the span of the distance between the piston plate and the anvil plate adjusts by rotating the drive mechanism to change the position of the anvil plate along the center axis of the drive mechanism.

8. The maintenance device according to claim 7 wherein the position of the piston plate relative to the anvil plate is controlled by the rotation of the drive mechanism.

9. The maintenance device according to claim 8 wherein the piston plate presses against the piston of the brake mechanism to force the piston into the caliper housing.

10. The maintenance device according to claim 9 wherein the drive mechanism comprises a drive cylinder, an exterior screw thread, and a handle;
   wherein the exterior screw thread is formed on the drive cylinder;
   wherein the handle attaches to an end of the handle.

11. The maintenance device according to claim 10 wherein the piston disk is a rigid structure;
   wherein the piston disk is a mechanical structure;
   wherein the piston disk has a disk structure;
   wherein the piston disk mounts on an end of the drive mechanism;
   wherein the piston disk presses against the piston to push the piston into the caliper housing.

12. The maintenance device according to claim 11 wherein the piston nut is a rigid structure;
   wherein the piston nut is a mechanical structure;
   wherein the piston nut has a nut structure;
   wherein the piston nut attaches to a face of the disk structure of the piston disk;
   wherein the piston nut attaches the drive mechanism to the piston disk;
   wherein the center axis of the piston nut aligns with the center axis of the piston disk;
   wherein the piston nut is positioned such that the center axis of the piston nut aligns with the center axis of the disk structure of the piston disk.

13. The maintenance device according to claim 12 wherein the piston interior screw thread is a negative space formed in the piston nut;
   wherein the negative space of the piston interior screw thread is formed with an interior screw thread;
   wherein the piston interior screw thread is sized such that the drive cylinder of the drive mechanism fits into the piston interior screw thread.

14. The maintenance device according to claim 13 wherein the anvil disk is a rigid structure;
   wherein the anvil disk is a mechanical structure;
   wherein the anvil disk has a disk structure;
   wherein the anvil receptacle is a mechanical structure;
   wherein the anvil receptacle is formed on the anvil disk;
   wherein the center axis of the anvil receptacle aligns with the center axis of the anvil disk;
   wherein the anvil receptacle is positioned such that the center axis of the anvil receptacle aligns with the center axis of the disk structure of the drive cylinder of the drive mechanism.

15. The maintenance device according to claim 14 wherein the drive cylinder is a cylindrical shaft structure;
   wherein the drive cylinder has a bolt structure that further comprises an exterior screw thread;
   wherein the exterior screw thread is formed on the lateral face of the drive cylinder;
   wherein the exterior screw thread forms the threaded connection between the anvil receptacle of the anvil disk and the drive cylinder of the drive mechanism;
   wherein the exterior screw thread forms the threaded connection between the piston nut of the piston disk and the drive cylinder of the drive mechanism;
   wherein the rotation of the drive cylinder within the anvil receptacle of the anvil disk causes the span of the distance between the piston plate relative to the center axis of the anvil plate to change;
   wherein the handle is a grip that attaches to the end of the drive cylinder that is distal from the piston disk of the piston plate;
   wherein the handle rotates the drive cylinder;
   wherein an end cap is a mechanical structure;
   wherein the handle comprises an end cap, and a lever;
   wherein the end cap attaches the lever to the drive cylinder such that the lever can rotate the end cap;
   wherein the lever is a prism-shaped shaft that attaches to the end cap such that the center axis of the prism structure of the lever is perpendicular to the center axis of the cylindrical structure of the drive cylinder.

\* \* \* \* \*